US012203396B2

(12) United States Patent
Sarder et al.

(10) Patent No.: US 12,203,396 B2
(45) Date of Patent: *Jan. 21, 2025

(54) DOUBLE-SIDED OIL COOLER FOR USE IN A GENERATOR ENGINE

(71) Applicant: Champion Power Equipment, Inc., Santa Fe Springs, CA (US)

(72) Inventors: Mark J. Sarder, Waukesha, WI (US); Russell J. Dopke, Elkhart Lake, WI (US); Hiroaki Sato, Brookfield, WI (US); Leigh A. Jenison, Hartland, WI (US)

(73) Assignee: Champion Power Equipment, Inc., Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/184,155

(22) Filed: Mar. 15, 2023

(65) Prior Publication Data

US 2023/0220791 A1 Jul. 13, 2023

Related U.S. Application Data

(63) Continuation of application No. 16/357,546, filed on Mar. 19, 2019, now Pat. No. 11,668,212.
(Continued)

(51) Int. Cl.
| | |
|---|---|
| *F01M 5/00* | (2006.01) |
| *F02B 63/04* | (2006.01) |
| *F16N 39/02* | (2006.01) |
| *F28F 3/02* | (2006.01) |
| *H02K 5/20* | (2006.01) |
| *H02K 7/075* | (2006.01) |

(Continued)

(52) U.S. Cl.
CPC ............ *F01M 5/002* (2013.01); *F02B 63/042* (2013.01); *F16N 39/02* (2013.01); *F28F 3/022* (2013.01); *H02K 5/207* (2021.01); *H02K 7/075* (2013.01); *H02K 7/1807* (2013.01); *H02K 7/1815* (2013.01); *H02K 9/06* (2013.01); *F28F 2250/102* (2013.01); *H02K 2205/09* (2013.01)

(58) Field of Classification Search
CPC ....... F01M 5/002; F02B 63/042; F28D 1/024; F28D 1/0308; F28D 9/0012; F28F 3/022; F28F 3/048; F28F 2250/102; H02K 7/1807
USPC .............................................. 123/41.8, 41.48
See application file for complete search history.

(56) References Cited

FOREIGN PATENT DOCUMENTS

DE 10303102 A1 * 7/2004 ............. F01M 5/002

* cited by examiner

*Primary Examiner* — Lindsay M Low
*Assistant Examiner* — Omar Morales
(74) *Attorney, Agent, or Firm* — Ziolkowski Patent Solutions Group, SC

(57) ABSTRACT

A standby generator includes an internal combustion engine, an alternator driven by the internal combustion engine to produce electrical power for distribution from the standby generator, and an adaptor component comprising a first end coupled to the engine and a second end spaced apart from the first end and coupled to the alternator. The adaptor component may be positioned such that the internal combustion engine is on a first side thereof and the alternator is on a second side thereof. An air-cooled oil cooler may be integrated with or affixed to the adapter component and include cooling fins formed on an outer surface thereof, the air-cooled oil cooler fluidly connected to the internal combustion engine to receive heated oil therefrom and return cooled oil thereto.

24 Claims, 10 Drawing Sheets

Related U.S. Application Data

(60) Provisional application No. 62/687,337, filed on Jun. 20, 2018.

(51) Int. Cl.
  *H02K 7/18* (2006.01)
  *H02K 9/06* (2006.01)

DOUBLE-SIDED OIL COOLER FOR USE IN A GENERATOR ENGINE

CROSS-REFERENCE TO RELATED APPLICATION

The present application is a continuation of, and claims priority to, U.S. patent application Ser. No. 16/357,546, filed Mar. 19, 2019, which is a non-provisional of, and claims priority to, U.S. Provisional Patent Application Ser. No. 62/687,337, filed Jun. 20, 2018, the disclosures of which are incorporated herein by reference in its entirety.

BACKGROUND OF THE INVENTION

Embodiments of the invention relate generally to oil coolers and, more particularly, to a double-sided oil cooler that is cooled by separate air flows on opposing sides thereof.

General purpose internal combustion engines used as prime movers in power generators and various other applications are often air cooled by an engine cooling fan and use an oil cooler placed within the air flow path of the cooling fan to supply cooled oil to the engine and maintain engine efficiency. The oil cooler is typically attached to a surface of the internal combustion engine facing the airflow and has conduits running from the oil cooler to the engine so as to route oil from the engine, to the oil cooler, and back to the engine.

Oil coolers used to maintain an acceptable oil temperature level have normally been of the tube and fin radiator type. The design of these units normally includes a flow path defined by tubing that forms a path between an inlet and outlet of the oil cooler. Hot oil is fed into the inlet of the oil cooler, from which it is distributed through the tubing along a defined, tortuous flow path to the outlet on the opposite end of the oil cooler. As the oil passes through the tubing on its way to the outlet, it transfers much of its heat to the tubing, which in turn transfers the heat to fins that are lodged between each row of tubes—with the oil being cooled as a result of heat exchange between the fins and the surrounding ambient air. The fins greatly increase the contact surface of the tubing to the air, thus increasing the exchange efficiency. The cooled oil is then fed back to the engine, and the cycle repeats.

While tube-and-fin radiator type oil coolers that are mounted to the engine block provide effective heat exchange for the oil, it is recognized that there are several limitations or drawbacks associated with such a design and arrangement. As one example, when the oil cooler is mounted to the surface of the internal combustion engine so as to be in the air flow path of the cooling fan, air flow to the internal combustion engine is blocked by the oil cooler. Therefore, areas of the internal combustion engine that would otherwise be in the air flow path are not able to be directly cooled by the air flow of the cooling fan, resulting in the engine having a higher operating temperature, and the oil having a higher temperature when leaving the engine and first arriving at the oil cooler-so as to decrease engine operating efficiency. Also, the amount of cooling provided by the oil cooler is limited due to air flow from the cooling fan being directed toward only one side of the oil cooler. Another drawback/limitation of a tube-and-fin radiator type oil cooler is that they are expensive to produce and difficult to repair when a leak develops therein, and the construction of the oil cooler is such that the volume of oil that is cycled therethrough may be limited below a desired amount.

Therefore, it would be desirable to provide an oil cooler that may be implemented in various devices that employ an internal combustion engine and be mounted in a location off of the engine. It would further be desirable for the oil cooler to be designed and mounted in a manner that allows for double-sided cooling thereof. It would still further be desirable for the oil cooler to have an increased volume that provides for cooling of a larger amount of oil.

BRIEF DESCRIPTION OF THE INVENTION

Embodiments of the invention are directed to a double-sided oil cooler that is cooled by separate air flows on opposing sides thereof, with such an oil cooler configured to be implemented in a generator engine.

In accordance with one aspect of the invention, a standby generator includes an internal combustion engine, an alternator driven by the internal combustion engine to produce electrical power for distribution from the standby generator, and an adaptor component comprising a first end coupled to the engine and a second end spaced apart from the first end and coupled to the alternator. The adaptor component may be positioned such that the internal combustion engine is on a first side thereof and the alternator is on a second side thereof. An air-cooled oil cooler may be integrated with or affixed to the adapter component and include cooling fins formed on an outer surface thereof, the air-cooled oil cooler fluidly connected to the internal combustion engine to receive heated oil therefrom and return cooled oil thereto.

In accordance with another aspect of the invention, a standby generator includes an internal combustion engine, an alternator driven by the internal combustion engine to produce electrical power for distribution from the standby generator, and an adaptor component comprising a first end coupled to the engine and a second end spaced apart from the first end and coupled to the alternator. The adaptor component may be positioned such that the internal combustion engine is on a first side thereof and the alternator is on a second side thereof, and an oil cooler may be integrated with or affixed to the adapter component between the internal combustion engine and the alternator. The oil cooler may be fluidly connected to the internal combustion engine to receive heated oil therefrom and return cooled oil back thereto.

In accordance with yet another aspect of the invention, an engine-generator set includes an alternator adaptor having an engine mount with a cooling air opening formed therein, an alternator mount, and a frame comprising an outer casing holding the engine mount aligned with the alternator mount. The outer casing includes an airflow inlet fluidically connected to the cooling air opening to allow flow of engine cooling air through the alternator adaptor. The engine-generator set may include an air-cooled engine coupled to the engine mount and an alternator coupled to the alternator mount of the alternator adaptor. The air-cooled engine includes a crankshaft extending through the cooling air opening to drive the alternator and an engine cooling fan coupled to the crankshaft on a side of the air-cooled engine facing the alternator adaptor. The engine-generator set may also include an oil cooler fluidly connected to the air-cooled engine and configured to receive heated oil therefrom and return cooled oil thereto, the oil cooler integrated with or affixed to the alternator adaptor.

Various other features and advantages will be made apparent from the following detailed description and the drawings.

BRIEF DESCRIPTION OF THE DRAWINGS

The drawings illustrate preferred embodiments presently contemplated for carrying out the invention.

In the drawings.

DETAILED DESCRIPTION OF THE PREFERRED EMBODIMENTS

Figure 1:
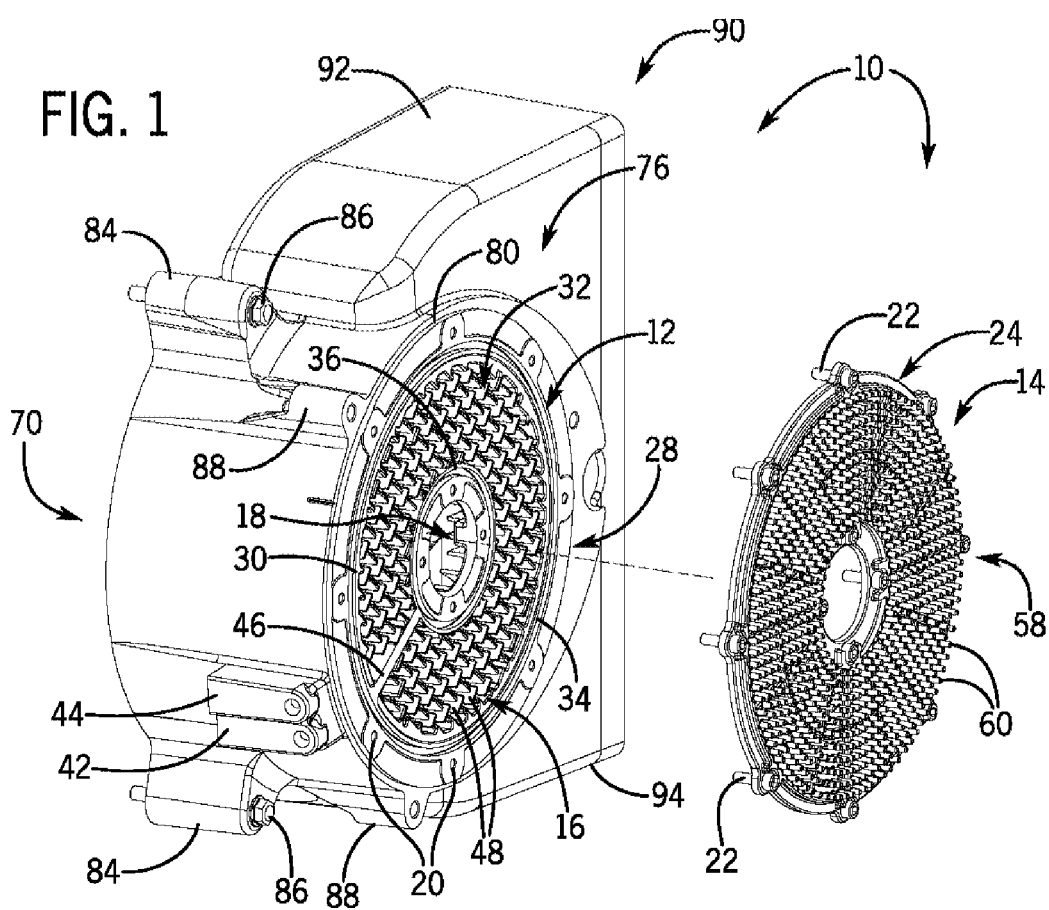
FIGS. 1 and 2 are exploded perspective views of an oil cooler and integrated adapter component from a front side and back side, respectively, in accordance with an embodiment of the invention.

An operating environment of the invention is described here below with respect to a standby generator having an internal combustion engine for power generation and an associated oil cooler for cooling the engine oil. However, it will be appreciated by those skilled in the art that embodiments of the invention are equally applicable for use with other devices that utilize an internal combustion engine as a prime mover and that employ an air-cooled oil cooler to supply cooled oil to the engine and maintain engine efficiency. Moreover, an embodiment will be described with respect to an internal combustion engine used to drive an alternator to generate electricity for distribution from the standby generator. However, one skilled in the art will further appreciate that the invention is equally applicable for use with internal combustion engines in applications other than for electrical power generation.

Referring to FIGS. 1-9, various views of a double-sided oil cooler 10 (and individual components thereof) are shown according to an exemplary embodiment of the invention. The oil cooler 10 functions to receive heated oil received from an engine that is fluidly connected thereto and circulates the heated oil therethrough in order to provide cooling to the oil before returning the oil to the engine. According to an exemplary embodiment of the invention, the oil cooler 10 is a "donut-type" oil cooler that provides a generally circular flow path that the oil flows along when circulating through the oil cooler 10. As will be explained in further detail below, while a generally circular flow path is defined by the donut-type oil cooler 10, the oil cooler 10 enables a tortuous flow with no set flow path therethrough—with the construction of the oil cooler 10 providing multiple undefined flow paths through which the oil may flow when moving between an inlet and outlet of the oil cooler 10.

As shown in FIGS. 1-9, the oil cooler 10 is constructed of a base plate 12 and a cover plate 14 that are joined together to from a cavity 16 (FIG. 9) through which heated oil received from an engine may flow to undergo cooling before being returned to the engine. The base plate 12 is formed as a generally oblong or oval shaped member and includes an opening 18 formed therein in a central region of the oblong/oval base plate 12 that extends therethrough. The base plate 12 also includes a plurality of threaded holes 20 formed therethrough that are configured to accommodate fasteners 22 therein for securing the cover plate 14 to the base plate 12 and, in one embodiment, for mounting/securing the oil cooler 10 in a desired position and orientation relative to its associated engine. Thus, according to one embodiment, threaded holes 20 may generally be formed in a circular arrangement at locations that correspond to an outer circumference 24 of the ring-shaped cover plate 14 and in a circular arrangement at locations that correspond to an inner circumference 26 of the ring-shaped cover plate 14.

Figure 5:
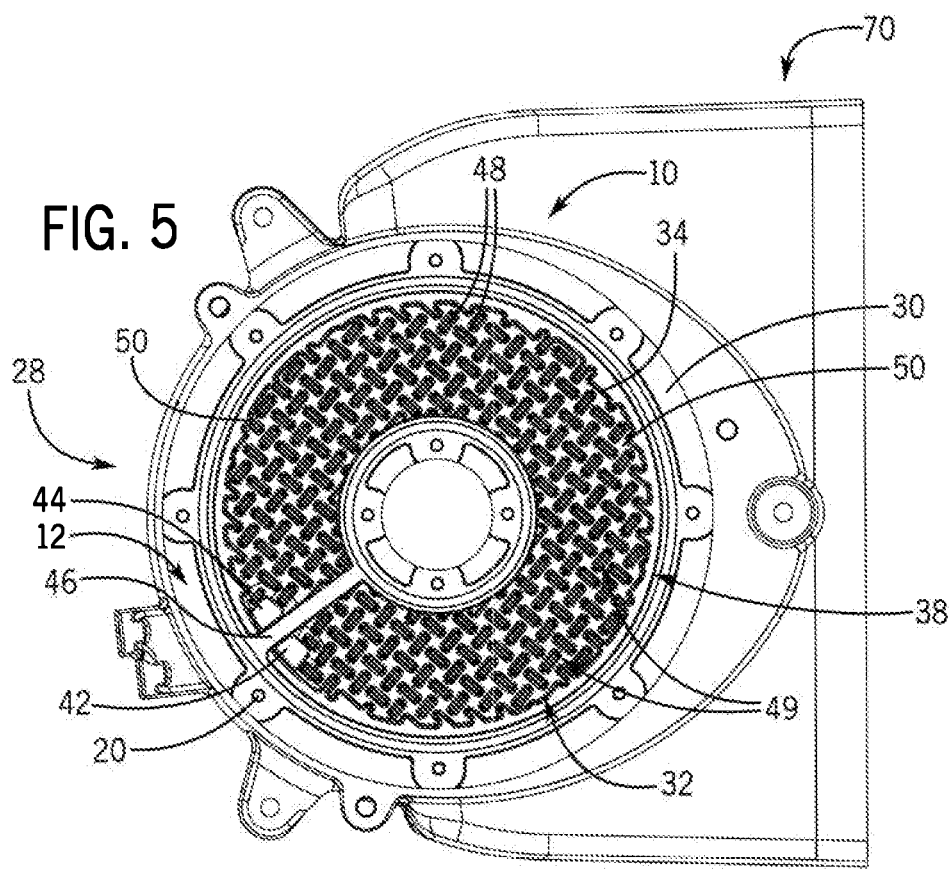
FIGS. 5 and 6 are a front view and rear view, respectively, of the base plate of the oil cooler and integrated adapter component of FIGS. 1 and 2.

As can best be seen in FIGS. 1 and 5, a first surface 28 of the base plate 12 is formed to generally define a raised portion 30 and a recessed portion 32. The recessed portion 32 is formed as a ring-shaped (or donut-shaped) recess that is defined by a generally circular exterior wall 34 and a circular interior wall 36 extending downward from the raised portion 30 to a bottom of the recessed portion 32. The raised portion 30 thus outlines an outer circumference 38 of the ring-shaped recessed portion 32 about exterior wall 34 and also outlines an inner circumference 40 of the ring-shaped recessed portion 32. The raised portion 30 of first surface 28 that outlines the inner circumference 40 of the ring-shaped recessed portion 32 also surrounds and defines the opening 18 formed through the base plate 12.

The raised portion 30 of first surface 28 includes the threaded holes 20 formed therein that receive fasteners 22 for securing the cover plate 14 to the base plate 12 and enclosing the recessed portion 32 to form a cavity 16. As shown in FIGS. 1 and 5, the recessed portion 32 includes an inlet port 42 and an outlet port 44 formed therein that enable oil to enter into the recessed portion 32 and exit from the recessed portion 32. A divider wall 46 is positioned in the recessed portion 32 at a location between the inlet port 42 and outlet port. The divider wall 46 extends between the exterior wall 34 and the interior wall 36 to separate the inlet port 42 from the outlet port 44—with a generally circular flow path thus being defined that the oil flows along when circulating through the oil cooler 10 from the inlet port 42 to the outlet port 44.

As shown in FIG. 5, a plurality of protrusions or wall portions 48 are positioned in the recessed portion 32 and arranged in a spaced apart fashion. According to an exemplary embodiment, the protrusions 48 are formed in the recessed portion 32 in a diamond plate or "waffle iron" pattern, with gaps provided between each respective protrusion 48 and one or more adjacent protrusions 48, and with adjacent protrusions 48 being formed at a different angle/orientation from adjacent protrusions 48. The waffle iron pattern of protrusions 48 provides a plurality of tortuous flow paths 49 through which oil flows from the inlet port 42 to the outlet port 44, such that there is no single defined flow path between the inlet port 42 and the outlet port 44. According to an exemplary embodiment, the exterior wall 34 includes finger portions 50 extending inwardly from the exterior wall 34 and into the recessed portion 32, with the finger portions 50 interacting with the protrusions 48 to further define the plurality of tortuous flow paths 49. That is, the finger portions 50 function to kick oil back into the plurality of tortuous flow paths 49 formed by the protrusions 48, with the protrusions 48 and the finger portions 50 thus preventing oil flow dead zones and short circuits within the cavity 16.

Figure 2:
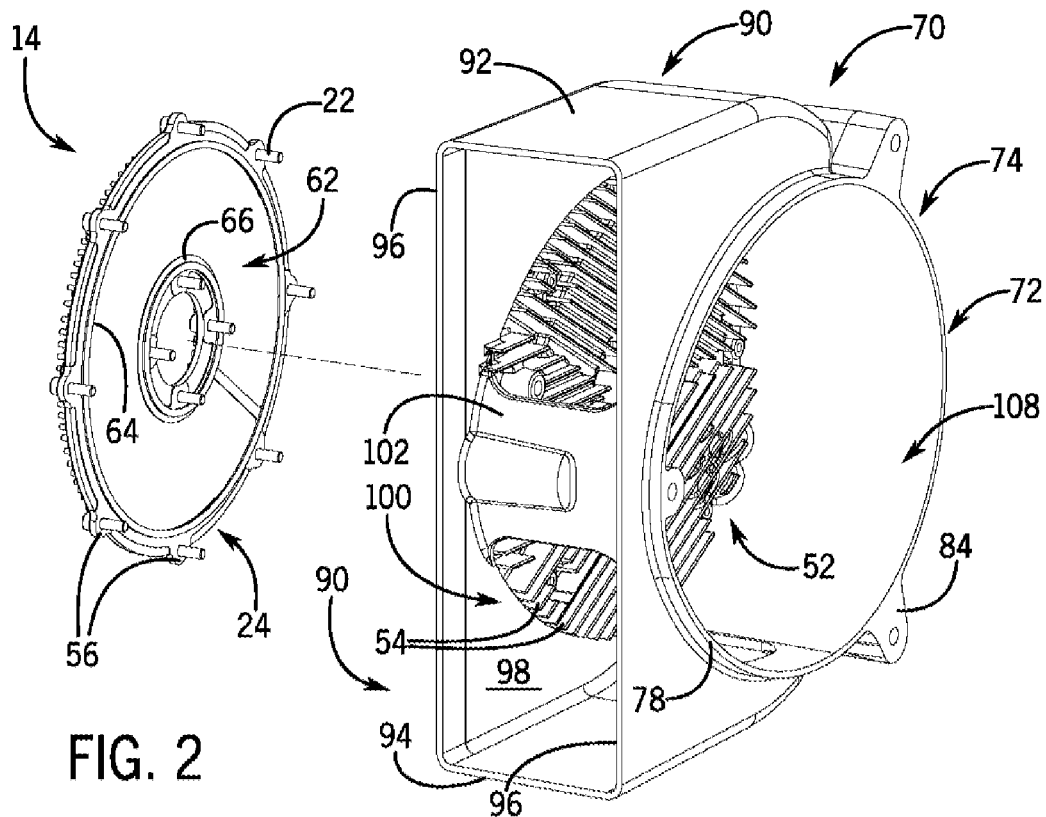
Figure 4:
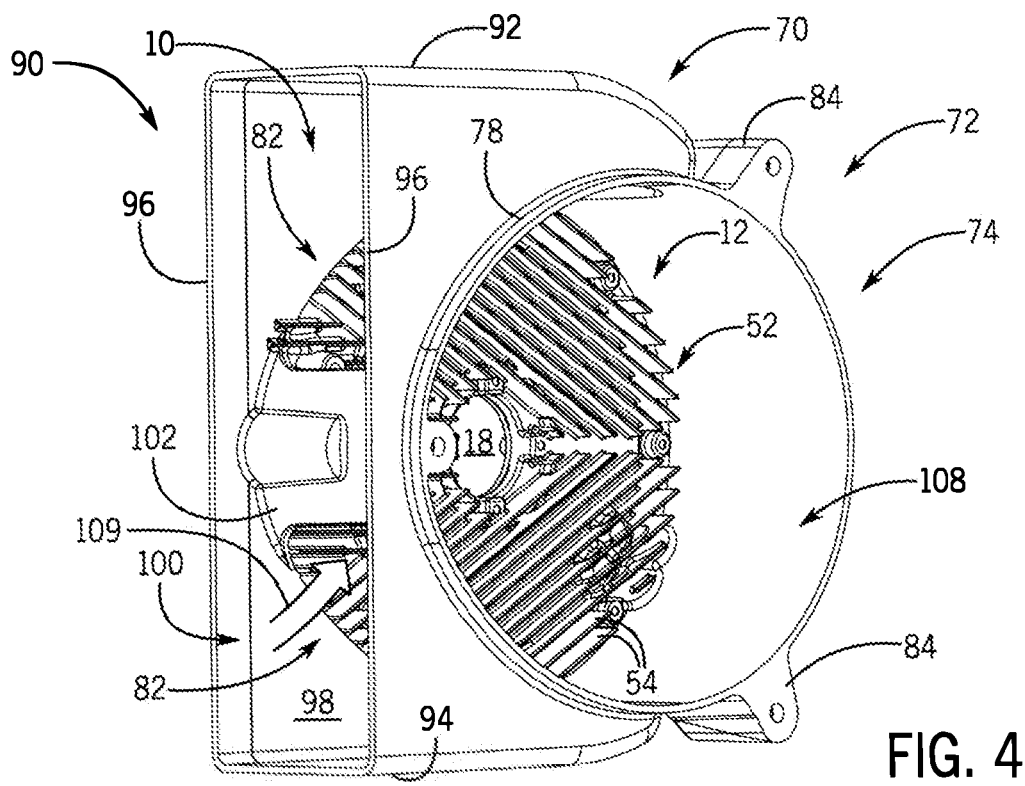
Figure 6:
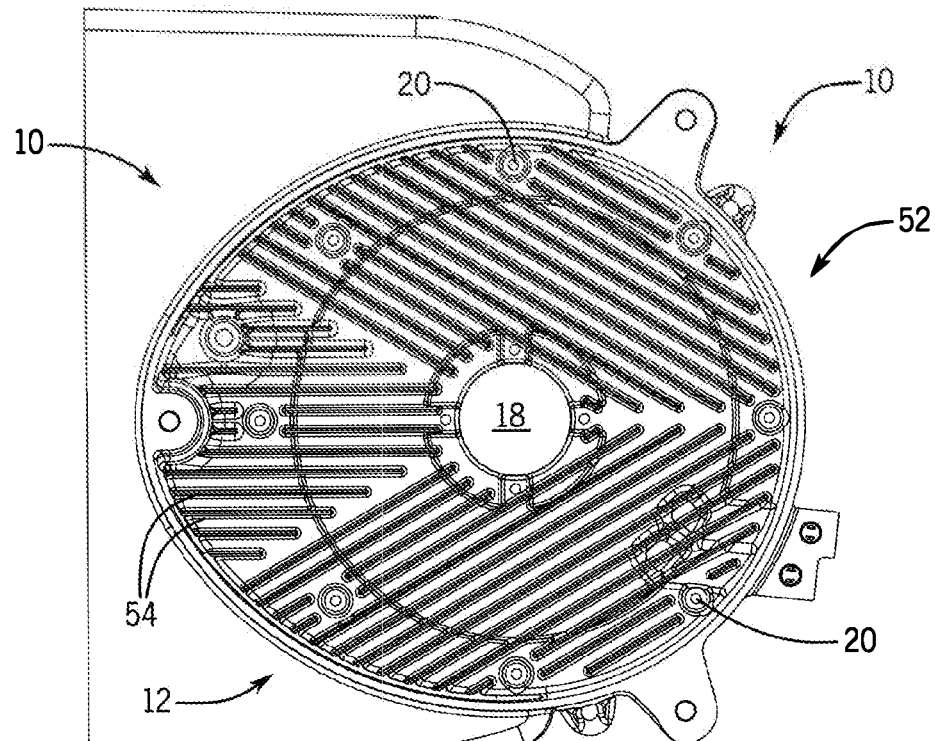

As can best be seen in FIGS. 2, 4, and 6, a second surface 52 of the base plate 12 that is opposite the first surface 28 is formed to include a set of heat sink fins 54 thereon. According to an exemplary embodiment, the heat sink fins 54 are constructed as plate fins and are thus referenced as plate fins 54 hereafter, although it is recognized that other fin structures (e.g., pin fins) could be substituted for the plate fins. The plate fins 54 generally cover an entirety of the second surface 52 of the oblong/oval base plate 12 and are arranged at a number of different locations and orientations on the second surface 52 so as to generally define a number of channels. A flow of cooling air from an air source is directed towards and across the plate fins 54 and is funneled through the channels so as to provide cooling to the second surface 52 of the base plate 12. In operation of oil cooler 10, heat is transferred from the oil circulating within cavity 16 to the base plate 12—with the plate fins 54 on the second surface 52 of the base plate 12 receiving a portion of this heat and transferring it to the ambient environment via convective heat transfer that is enhanced by the flow of cooling air directed across the plate fins 54.

Figure 7:
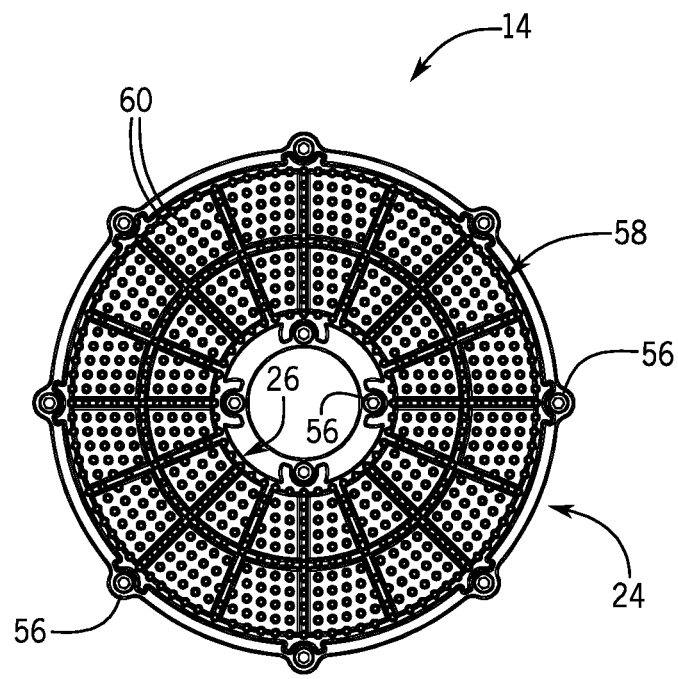
FIGS. 7 and 8 are a front view and rear view, respectively, of the cover plate of the oil cooler of FIGS. 1 and 2.
Figure 8:
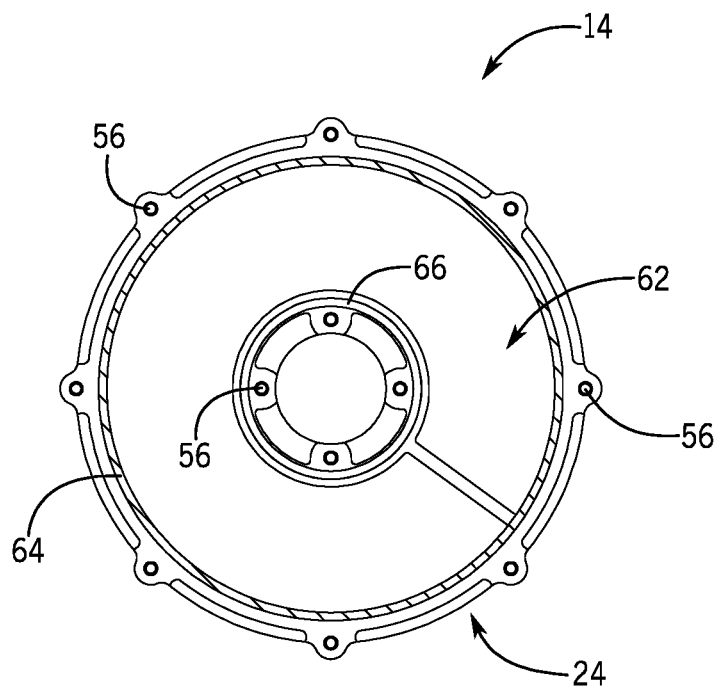
Figure 9:
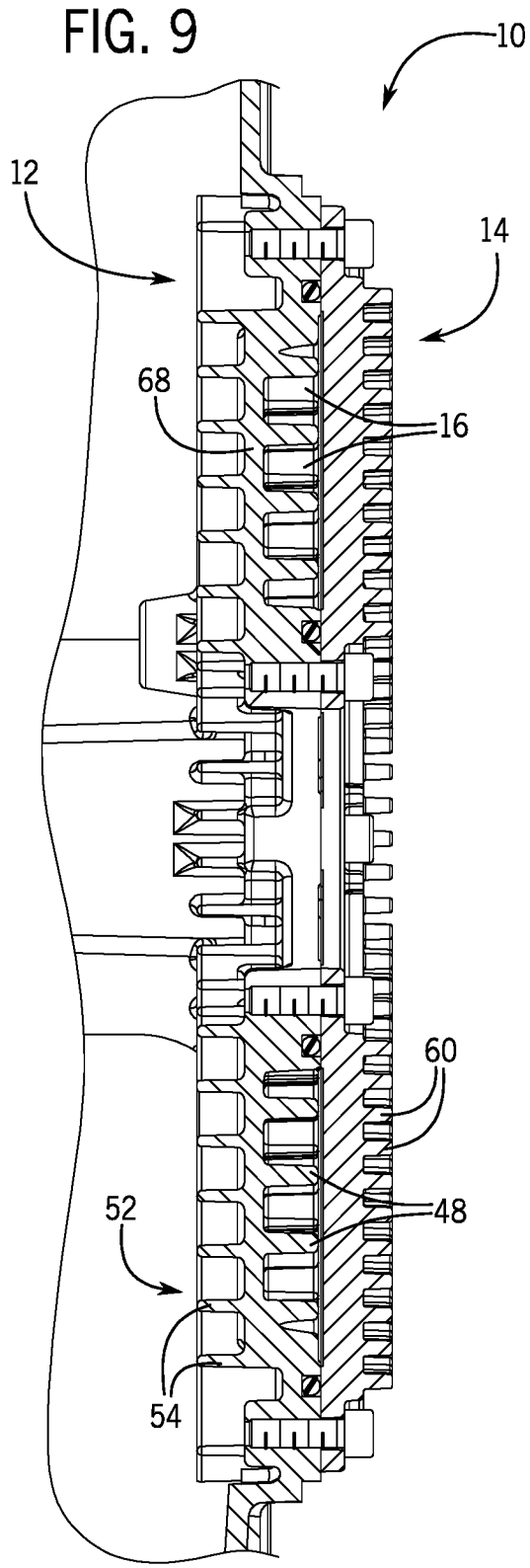
FIG. 9 is a cross-sectional view of the oil cooler shown in FIG. 3 taken along line 9-9.

More detailed views of the cover plate 14 are shown in FIGS. 7 and 8. As can be seen therein, the cover plate 14 is a ring or donut shaped plate having a size that matches that of the recessed portion 32 of base plate 12. The cover plate 14 includes a plurality of threaded holes 56 formed therethrough that are configured to accommodate fasteners 22 therein for securing the cover plate 14 to the base plate 12. Thus, according to one embodiment, threaded holes 56 may generally be formed in a circular arrangement at locations that correspond to the threaded holes 22 formed in base plate 12—i.e., along the outer circumference 24 and inner circumference 26 of the ring-shaped cover plate 14.

A front surface 58 of the cover plate 14 is formed to include a set of heat sink fins 60 thereon. According to an exemplary embodiment, the heat sink fins 60 are constructed as pin fins and are thus referenced as pin fins 60 hereafter, although it is recognized that other fin structures (e.g., plate fins) could be substituted for the pin fins 60. The pin fins 60 generally cover an entirety of the front surface 58 of the cover plate 14. A flow of cooling air from an air source is directed towards and across the pin fins 60 so as to provide cooling to the cover plate 14 of oil cooler 10. In operation of oil cooler 10, heat is transferred from the oil circulating within cavity 16 to the cover plate 14—with the pin fins 60 on the front surface 58 of the cover plate 14 receiving a portion of this heat and transferring it to the ambient environment via convective heat transfer that is enhanced by the flow of cooling air directed across the pin fins 60.

A back surface 62 of the cover plate 14 that mates with the base plate 12 is formed as a generally flat surface and includes a pair of O-rings 64, 66 thereon (proximate outer circumference 24 and inner circumference 26) that form a tight seal with base plate 12 upon securing of the cover plate 14 to the base plate 12. As best seen in the cross-sectional view of oil cooler 10 shown in FIG. 9, the flat back surface 62 of cover plate 14 is mounted flush with the protrusions 48 and divider wall 46 in the recessed portion 32 of base plate 12 such that fluid flow paths are formed by a bottom 68 of the recessed portion 32, the protrusions 48/divider wall 46, and the back surface 62 of the cover plate 14. As described previously, a plurality of tortuous flow paths is thus formed in the cavity 16 through which oil flows from the inlet port 42 to the outlet port 44, such that there is no single defined flow path between the inlet port 42 and the outlet port 44.

The structure of oil cooler 10—with the set of fins 54 of base plate 12 extending out from one surface of the oil cooler 10 and the set of fins 60 of cover plate 14 extending out from the opposite surface of the oil cooler 10—provides for a double-sided oil cooler 10 that may be cooled on both sides to optimize a thermal transfer of heat from the engine oil flowing therethrough to the ambient environment. That is, the plate fins 54 on the second surface 52 of the base plate 12 and the pin fins 60 on the front surface 58 of the cover plate 14 provide for enhanced cooling of both opposing surfaces of the oil cooler 10. Separate air flows may be directed over each of the plate fins 54 and the pin fins 60 to further enhance the rate of convective heat transfer provided by the oil cooler 10, as will be explained in further detail below.

While the double-sided oil cooler 10 has been described above in isolation as a stand-alone component (that may be mounted by way of fasteners 22 to a desired structure), an exemplary embodiment of the invention is directed to the integration of the oil cooler 10 into an adaptor component 70 to form an "oil cooler assembly" as is shown in FIGS. 1-6. In the illustrated embodiment, the oil cooler 10 is integrated into an adaptor component 70 that provides for a desired arrangement and coupling of an internal combustion engine with an alternator, such as might be desired in a standby generator for example, and thus the adaptor component 70 is hereafter referred to as an "alternator adaptor 70." A more detailed description of the alternator adaptor 70 is set forth here below along with integration of the oil cooler 10 therewith. While oil cooler 10 is described here below as being formed integrally with the alternator adaptor 70, such as via a machining and/or casting operation that forms the alternator adaptor 70 and oil cooler 10 as a single piece, it is recognized that the oil cooler 10 could instead be mounted on and affixed to the alternator adaptor 70 by way of appropriate fasteners.

As best shown in FIGS. 1-4, alternator adaptor 70 includes a main body 72 that comprises a first end 74 that is couplable to an internal combustion engine and a second end 76 opposite the first end 74 that is couplable to an alternator. The main body 72 is formed a generally cylindrically shaped member and includes an engine mounting flange 78 formed at the first end 74 that enables mounting of the engine to the alternator adaptor 70 and an alternator mounting flange 80 at the second end 76 that enables mounting of the alternator to the alternator adaptor 70. The main body 72 includes one or more vents 82 on one side thereof to provide an opening into the interior of the cylindrical main body 72, with the vent(s) 82 being formed at a location between the first and second ends 74, 76. A first set of mounting projections 84 are formed on the main body 72 at the first and second ends 74, 76 that receive fasteners 86 coupling the engine to the alternator adaptor 70, and a second set of mounting projections 88 are formed on the main body 72 that receive fasteners 86 coupling the alternator to the alternator adaptor 70. The mounting projections 84, 88 each have an opening formed therein to receive the fasteners 86.

The alternator adaptor 70 also includes an inlet air duct 90 (i.e., engine air duct) extending outwards from a side of the main body 72 between the engine mounting flange 78 and the alternator mounting flange 80. The inlet air duct 90 has a generally rectangular cross-section having a width approximately equal to the length of the main body 72, and a height slightly larger than a diameter of the cylindrical main body 72. The inlet air duct 90 extends across a center of the main body 72, with a top wall 92, bottom wall 94, and side walls 96 generally defining an interior volume 98 of the inlet air duct 90 and outlining a rectangular opening 100 (i.e., "air inlet") on one side of the inlet air duct 90 that is oriented perpendicular to the cylindrical main body 72. The top wall 92 and bottom wall 94 curve into the cylindrical main body 72 on an end thereof opposite the rectangular opening 100. The side walls 96 are joined to main body 72 at locations such that the vent(s) 82 in the main body 72 are positioned within the inlet air duct 90, with the rectangular opening 100 thus being in fluid communication with the vent(s) 82.

According to one embodiment, the alternator adaptor 70 includes a support arm 102 extending between the side walls 96 of the inlet air duct 90. The support arm 102 may be formed so as to have a curved profile that matches that of the cylindrical main body 72 and may be positioned so as to bisect the vent 82 formed in the main body 72, thereby serving to define two separate vents 82 in the main body 72 in fluid communication with inlet air duct 90. The support arm 102 has an opening 104 formed therein aligned with an opening 106 in the side wall 96 of inlet air duct 90 on the second end 76 of main body 72 for accommodating a fastener to couple the alternator adaptor 70 to the engine.

As shown in FIGS. 2 and 4, the first end 74 of main body 72 is left open to provide an airflow outlet 108—with the airflow outlet 108 defined by the engine mounting flange 78. The airflow outlet 108 places the interior volume of the inlet air duct 90 in fluid communication with the engine that is connected to the engine mounting flange 78 of the alternator adaptor 70. An air flow path is thus provided from the inlet air duct 90, through the vent(s) 82 in main body 72, and out through the airflow outlet 108 of the alternator adaptor 70. Air may thus be drawn in along the air flow path by an engine cooling fan adjacent the airflow outlet 108 and then blown by the engine cooling fan across the internal combustion engine that is mounted to the alternator adaptor 70.

Figure 3:
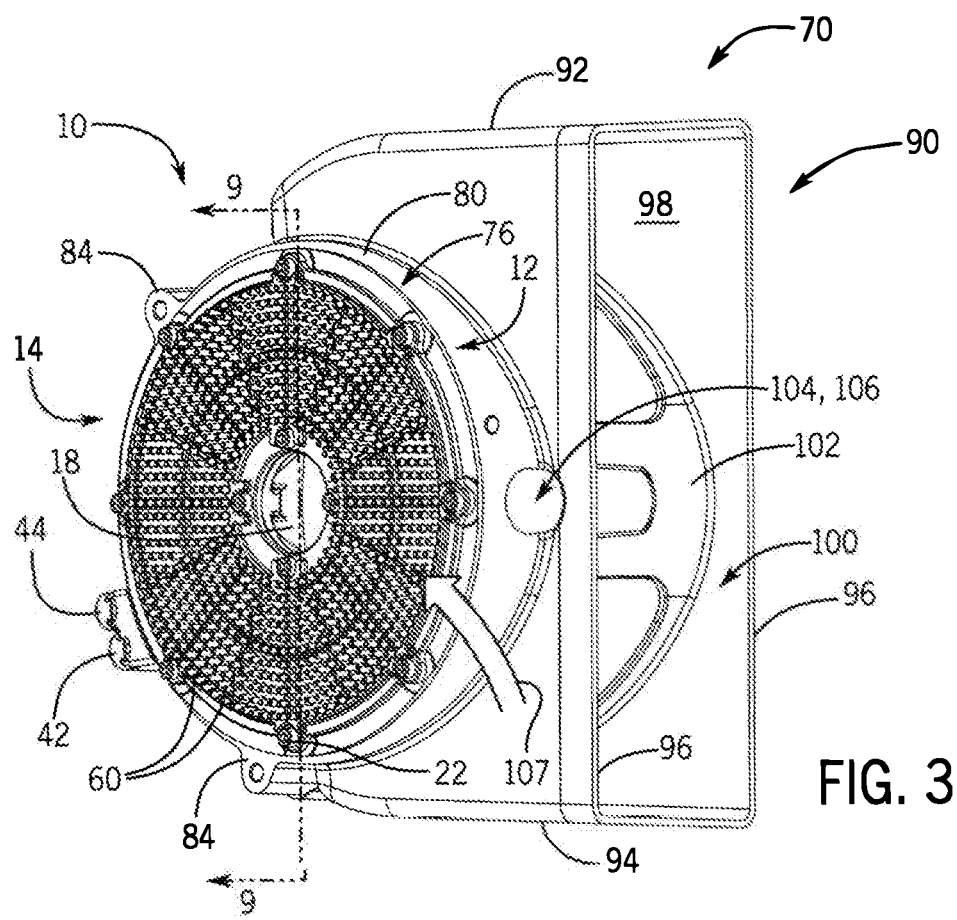
FIGS. 3 and 4 are assembled perspective views of the oil cooler and integrated adapter component of FIGS. 1 and 2 from the front side and back side, respectively.

As shown in FIGS. 1 and 3, the second end 76 of main body 72 is covered by oil cooler 10—with the alternator mounting flange 80 forming a mounting feature on the first surface 28 of the base plate 12 of the oil cooler 10. In an exemplary embodiment, the oil cooler 10 is formed integrally with the alternator adaptor 70—with it being understood that the oil cooler 10 could be considered as forming part of the main body 72 or as forming part of the side wall 96 of inlet air duct 90 that is adjacent the second end 76 of the main body 72. The alternator mounting flange 80 is formed on base plate 12 of oil cooler 10 at a location adjacent where the cover plate 14 is fastened to base plate 12, in an area outside of the cover plate 14 mounting location, such that the oil cooler 10 does not interfere with mounting of the alternator to the alternator adaptor 70. As previously described, the oil cooler 10 includes an opening 18 formed therethrough that accommodates an engine crankshaft and/or alternator shaft therein—with it being recognized that the opening 18 is configured/sized to prevent substantial airflow through the oil cooler 10, so as to separate an airflow on the first side of the oil cooler 10 from an airflow on the second side of the oil cooler 10.

As the oil cooler 10 is formed into alternator adaptor 70 at the second end 76 of the main body 72 and as part of the side wall 96 of inlet air duct 90 that is adjacent the second end 76 of the main body 72, the side wall 96 of inlet air duct 90 effectively separates the front and back surfaces of the oil cooler 10 from one another. That is, the plate fins 54 on second surface 52 of base plate 12 are positioned within the interior volume 100 of the inlet air duct 90, while the pin fins 60 on the cover plate 14 are positioned outside of the inlet air duct 90. The separation of the front and back surfaces of the oil cooler 10 provided by the inlet air duct 90 allows for a first air flow path 107 to be directed across the plate fins 54 and a second air flow path 109 across the pin fins 60—with the first and second air flows being separate from one another, such that each air flow can be independently controlled across the oil cooler 10. According to one embodiment, the air flows across the opposing sides of the oil cooler 10 can be controlled based on the cooling needs of the engine and alternator coupled to the alternator adaptor 70.

Figure 10:
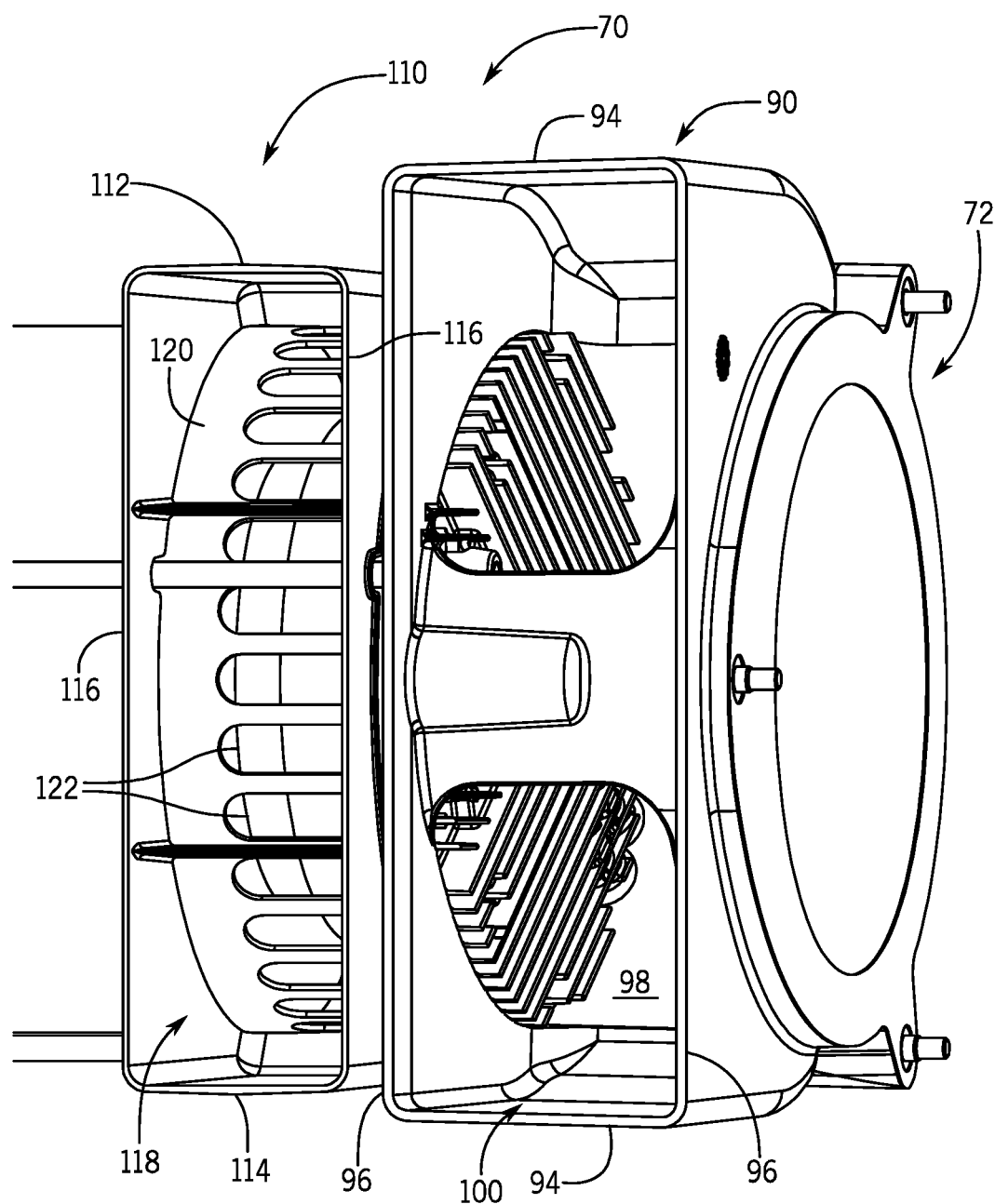
FIGS. 10 and 11 are a front right perspective view and front left perspective view, respectively, of an oil cooler and integrated adapter component that includes an alternator cooling duct, in accordance with an embodiment of the invention.
Figure 11:
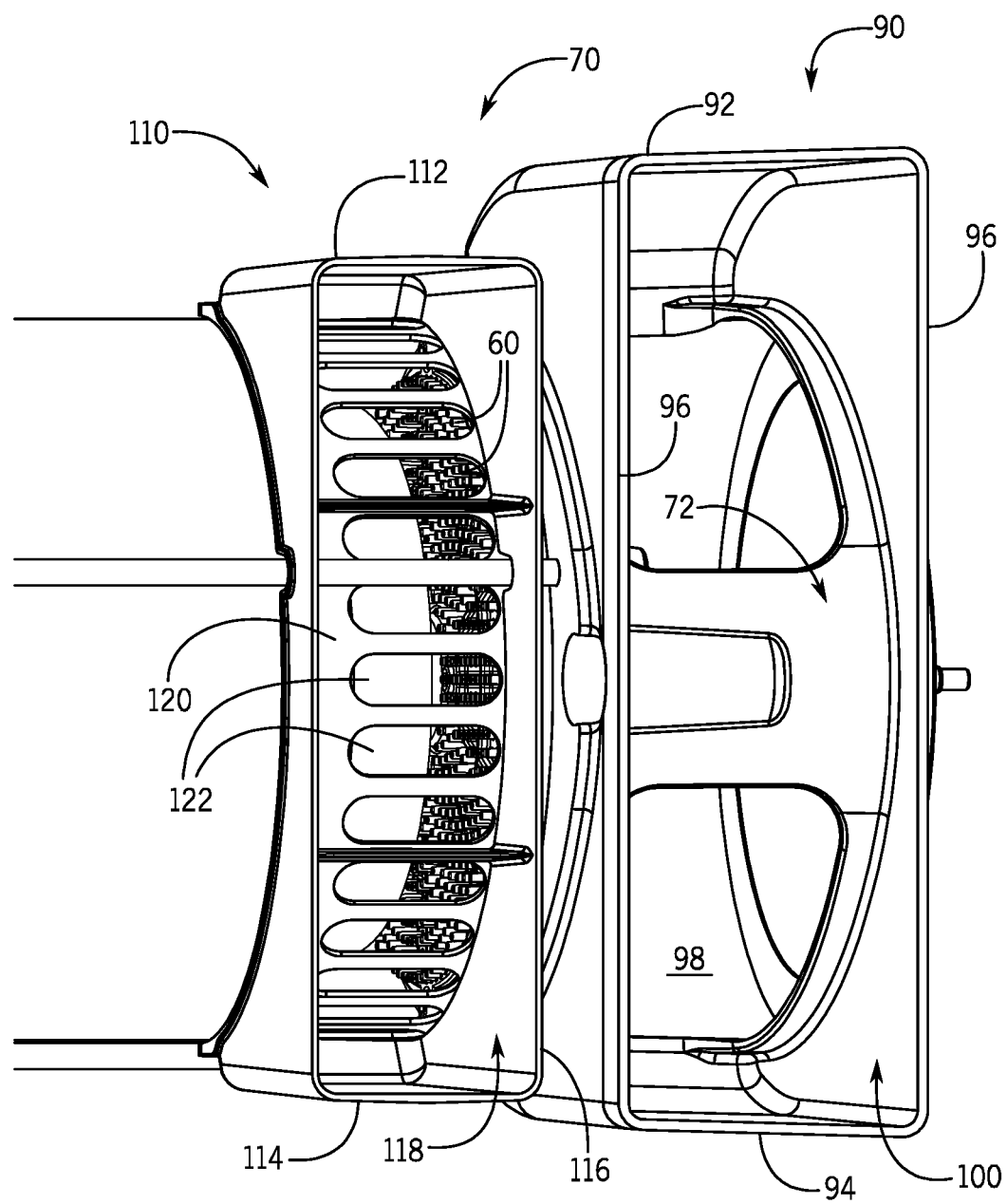

Referring now to FIGS. 10 and 11, according to an exemplary embodiment, the alternator adaptor 70 further includes an alternator cooling duct 110 that directs an air flow (i.e., second air flow) across the pin fins 60 of the oil cooler 10. The alternator cooling duct 110 is positioned adjacent the inlet air duct 90 and next to the side wall 96 thereof that includes the oil cooler 10 integrated therein. The alternator cooling duct 110 is similar in shape to inlet air duct 90 but may be smaller in size as compared to the inlet air duct 90. The alternator cooling duct 110 may thus have a generally rectangular cross-section, with a top wall 112, bottom wall 114, and side walls 116 generally defining an interior volume of the alternator cooling duct and outlining a rectangular opening 118 on one side of the alternator cooling duct 110 that is positioned adjacent the opening 100 of inlet air duct 90. The top wall and bottom wall of alternator cooling duct 110 curve in to mate flush with a surface of the alternator that is mounted to the alternator mounting flange 80. Specifically, the alternator cooling duct 110 mates with a cylindrical outer casing 120 of the alternator that includes a plurality of vents 122 therein, with the outer casing 120 positioned about oil cooler 10 so as to be positioned over the pin fins 60 of cover plate 14. A flow path between the rectangular opening 118 of alternator cooling duct 110 and the pin fins 60 is thus provided—with an air flow (i.e., second air flow) entering into the rectangular opening 118 of alternator cooling duct 110, flowing through vents 122 in outer casing 120, and then flowing across the pin fins 60 of oil cooler 10 to provide cooling thereto.

The integration of oil cooler 10 into alternator adaptor 70 thus provides a means for providing separate air flows across heat sink fins 54, 60 on opposing sides of the oil cooler 10, with the air flows being independently controlled to provide optimized cooling to each of an engine and an alternator coupled to the alternator adaptor 70. The double-sided cooling provided to oil cooler 10 by the separate air flows increases convective heat transfer between the oil cooler 10 and the ambient environment, thereby providing for effective regulation of the engine oil temperature and efficient operation of the internal combustion engine.

Figure 12:
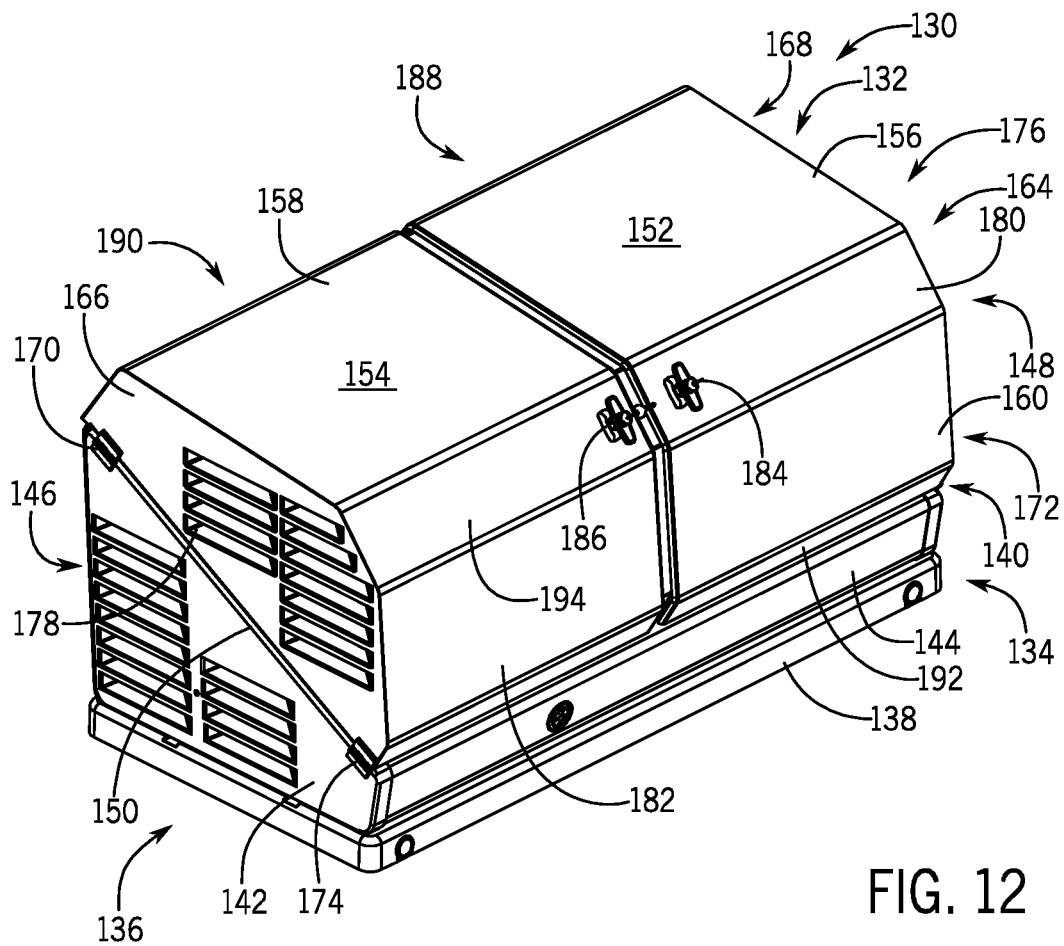
FIG. 12 is a perspective view from the left upper side of an electrical generator having the oil cooler and integrated adapter component of FIGS. 1 and 2 incorporated therein, according to an embodiment of the invention.

Referring now to FIG. 12, integration of the oil cooler 10 and adaptor component 70 into a standby generator 130 is shown in accordance with an embodiment of the invention. The standby generator 130 produces electrical energy and may deliver the electrical energy to a distribution panel of a home, office, shop, business or any other building requiring electricity. The standby generator 130 may include an internal combustion engine, an alternator driven by the internal combustion engine, and other associated components. The internal combustion engine operates on a fuel source that may include gasoline, diesel, liquefied petroleum gas (LPG), propane, butane, natural gas, or any other fuel source suitable for operating the engine. For instance, the internal combustion engine may comprise a single fuel engine configured to operate on one of the fuels. Alternatively, the engine may comprise a dual fuel or multi-fuel engine configured to switch operation between two or more of the fuel sources. In one embodiment, the engine may comprise a dual fuel engine configured to switch operation between LPG and gasoline, or LPG and diesel. The alternator and engine may form an engine-generator set used to produce electricity for distribution from the standby generator 130.

The standby generator 130 may include a standby generator enclosure 132 to house the engine-generator set and other associated components. In the embodiment of FIG. 12, the engine-generator set is positioned in a horizontal crankshaft arrangement with the alternator located toward a first end 134 of the enclosure 132 and the engine located toward a second end 136 of the enclosure 132. The standby generator enclosure 132 may include a base 138 to support the engine-generator set. The enclosure 132 may also have a first sidewall 140 and a second sidewall 142 each extending generally vertically from opposite ends of the base 138 at the first end 134 and the second end 136 of the enclosure 132, respectively. The enclosure 132 may also include a front wall 144 and a back wall 146 extending generally vertically from the base 138 between the first sidewall 140 and the second sidewall 142, with the front wall 144 and the back wall 146 defining a front and a back sidewall of the standby generator 130. The front wall 144 and the back wall 146 may be angled slightly from vertical such that each has a bottom portion positioned slightly inward from a corresponding top portion. The first sidewall 140 and the second sidewall 142 may each have a respective top edge 148, 150 that generally slopes diagonally from a taller back wall 146 to a shorter front wall 144.

The enclosure 132 may also include one or more hoods to cover the standby generator 130. The embodiment shown in FIG. 12 has a first hood 152 and a second hood 154, also referred to as doors, coupled to a respective first sidewall 140 and second sidewall 142. The first hood 152 and the second hood 154 may each have a top panel 156, 158, a front panel 160, 162, and a side panel 164, 166 with the side panels generally perpendicular to the respective top and front panels. The side panels 164, 166 of each hood 152, 154 may each be coupled to a respective one of the first sidewall 140 and the second sidewall 142 of the enclosure 132 using a first hinge 168, 170 and a second hinge 172, 174. The side panels 164, 166 may include vents 176, 178 with louvers, and vents may be formed in the first sidewall 140 and the second sidewall 142. The top panels 156, 158 are preferably sloped downward toward the front of the enclosure 132 and the front panels 160, 162 may slope forward toward the base 138 of the enclosure 132 to enhance water runoff.

Each hood 152, 154 may also have a front transition panel 180, 182 between the respective top panel 156, 158 and the front panel 160, 162. The front transition panels 180, 182 further encourage water runoff and add to an aesthetically pleasing design. A handle 184, 186 may be attached to the front transition panel 180, 182 of each hood 152, 154 for opening the hoods and exposing internal components of the standby generator 130. The front transition panels 180, 182 are designed so the handles 184, 186 enhance accessibility by directionally facing a person standing in front of the enclosure 132 when the hoods 152, 154 are closed. Each hood 152, 154 may also have a rear transition panel 188, 190 that slopes downward from the respective top panel 156, 158 toward the back wall 146 when the hoods are closed. Each hood 152, 154 may also have a lower transition panel 192, 194 that slopes inward from the respective front panel 160, 162 toward the front wall 144 when the hoods are closed. The rear transition panels 188, 190 and the lower transition panels 192, 194 further encourage water runoff and add to an aesthetically pleasing design.

Figure 13:
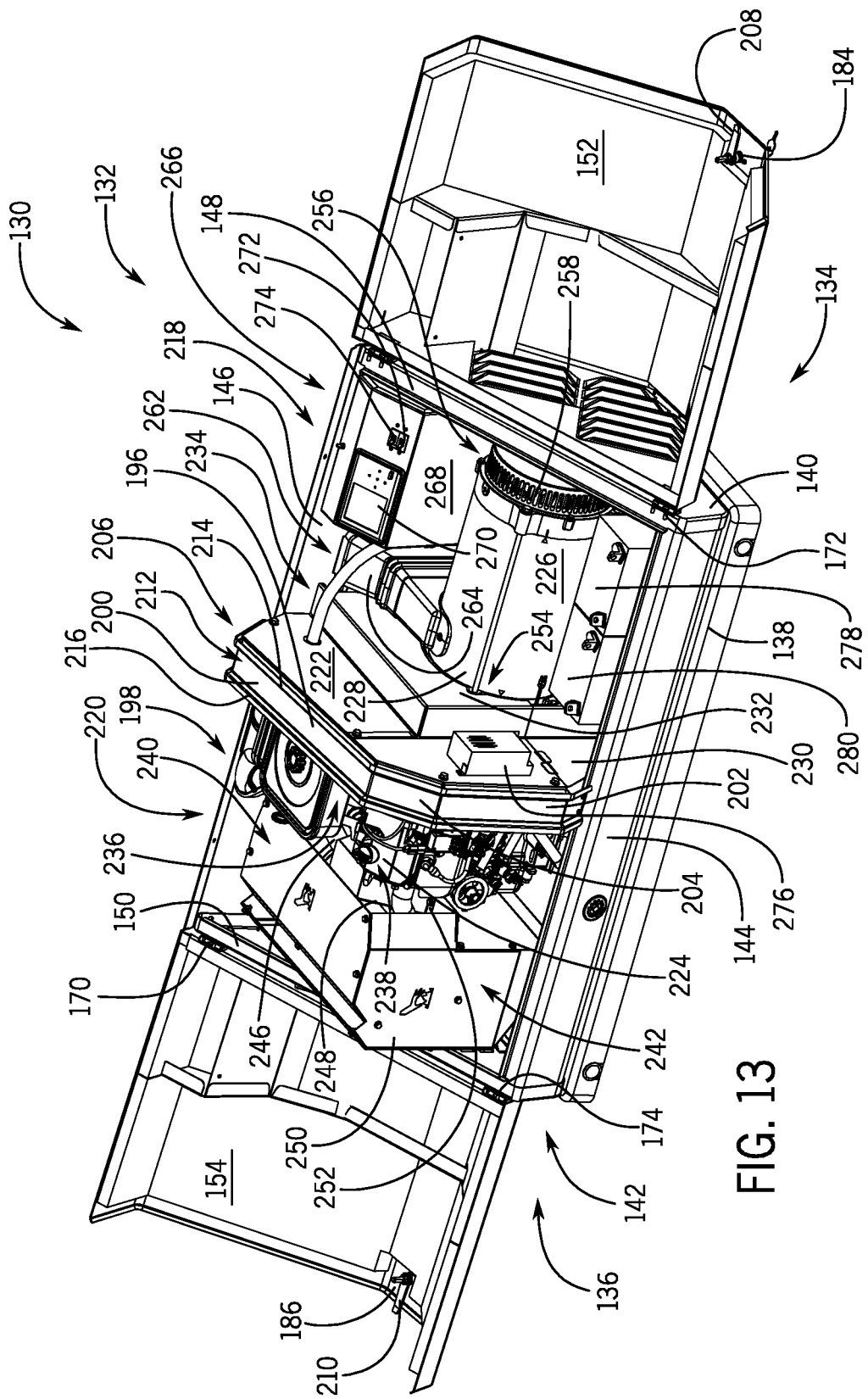
FIG. 13 is a perspective view from the right upper side of the electrical generator of FIG. 12 with left and right doors opened to expose the electrical generator components within.

Referring now to FIG. 13, the standby generator 130 is shown having first hood 152 and second hood 154 in an open position. The generator enclosure 132, also referred to as a housing 132, may have a base 138, a top (i.e. hoods 152, 154), and a plurality of sidewalls 140, 142, 144, 146 defining an interior of the housing. The first hood 152 and the second hood 154 may be coupled to a respective sidewall 140, 142 using a first hinge 168, 170 and a second hinge 172, 174 with the first hinges near the back of the enclosure 132 and the second hinges near the front of the enclosure 132. The first hood 152 may be hinged to the enclosure 132 to rotate over a top of the first sidewall 140 and the second hood 154 may be hinged to the enclosure 132 to rotate over a top of the second sidewall 142. The first hood 152 and the second hood 154 may rotate about an upper or top edge 148, 150 of each respective sidewall 140, 142 beyond the first end 134 and the second end 136 of the enclosure 132 in a "gull wing" configuration for ease of access and serviceability to the generator 130. The "gull wing" configuration may allow the hoods 152, 154 to open without contacting a home, office, shop, business, or any other building requiring electricity located behind the standby generator 130.

The first hood 152 and the second hood 154 may open outwards beyond the respective first sidewall 140 and second sidewall 142 to expose a top and front entrance into the enclosure 132. The front wall 144 may be relatively short compared to the overall height of the enclosure 132 in part to allow for improved front access into the enclosure 132 when the hoods 152, 154 are open. The back wall 146 may be relatively tall compared to the front wall 144 with the first sidewall 140 and the second sidewall 142 having a forward sloping top edge 148, 150 from the back wall 146 to the front wall 144. The first hood 152 and the second hood 154 can then open upward and slightly forward as they rotate along the forward sloping top edge 148, 150 of each respective sidewall 140, 142. In other embodiments, the first hood 152 and the second hood 154 may rotate about a horizontal or vertical edge of a respective first sidewall 140 and second sidewall 142 between opened and closed positions.

FIG. 13 also shows a support arm 196 extending across a center of the enclosure 132 to support the first hood 152 and the second hood 154 in the closed position. The support arm 196 extends from the back wall 146 over an engine-generator set 198 to the front wall 144 in the enclosure 132. The support arm 196 may have a geometry that matches the first hood 152 and the second hood 154 to ensure the hoods close tightly against the support arm. Accordingly, the support arm 196 may have a top panel 200, a front panel 202, a front transition panel 204, and a rear transition panel 206 to match the first hood 152 and the second hood 154. The support arm 196 may also receive a latch 208, 210 from each handle 184, 186 to hold the first hood 152 and the second hood 154 closed.

The support arm 196 preferably has a channel or gutter 212 extending the length of the support arm to channel water off the front and back of the enclosure 132. The gutter 212 may be formed by raised outer edges that include a first rain seal 214 and a second rain seal 216 on opposite sides of the support arm 196. The first rain seal 214 and the second rain seal 216 each support and seal a respective hood 152, 154 in the closed position. The first rain seal 214 and the second rain seal 216 may also extend across portions of the back wall 146, front wall 144, and respective first and second sidewalls 140, 142 to seal around each perimeter entrance covered by the hoods 152, 154. The rain seals 214, 216 prevent rain from entering the enclosure 132 and may make the enclosure rain tight. Although some water may enter the enclosure 132 without negatively affecting the generator 130, it is desirable to prevent water from entering the electrical areas within the enclosure 132. The rain seals 214, 216 may make the electrical areas within the enclosure 132 rain tight.

In one embodiment of the invention, the enclosure 132 may comprise a multi-chamber standby generator enclosure comprising a plurality of chambers. The enclosure 132 may be separated into a right chamber 218 and a left chamber 220 by a partition wall 222, with the engine 224 and the alternator 226 mounted in separate respective chambers 218, 220 of the plurality of chambers. The partition wall 222 may extend from the support arm 196 to the base 138 of the enclosure 132, and also from the front wall 144 to the back wall 146 of the enclosure 132. The partition wall 222 may have an opening 228 through which the engine 224 mounted to the base 138 in the left chamber 220 can couple to drive the alternator 226 mounted to the base 138 in the right chamber 218. The partition wall 222 may comprise a main segment 230 aligned with the support arm 196 and an offset segment 232 spaced apart from the main segment in a direction opposite the engine 224. The offset segment 232 provides clearance for air to flow between the engine 224 and air inlet duct 90 from an airflow opening 234 in the back wall 146.

FIG. 13 shows the engine 224 mounted in a horizontal crankshaft orientation with the crankshaft driving the alternator 226 through the opening 228 in the partition wall 222. The engine 224 may comprise an air-cooled engine having an engine cooling fan 236 at a front portion of the engine facing the partition wall 222. The engine fan 236 may draw a stream of air along the offset segment 232 of the partition wall 222 into the enclosure 132 through the airflow opening 234 in the back wall 146. The engine fan 236 preferably drives the stream of air over cylinders 238, 240 of the engine 224 in a direction toward the second end 136 of the enclosure 132. The engine 224 may also include an exhaust system 242 operatively coupled to the engine 224, the exhaust system 242 may comprise one or more exhaust pipes 244, 246 extending from the engine 224 in a direction downstream from the engine cooling fan 236, and a muffler 248 may be coupled to at least one of the one or more exhaust pipes 244, 246.

The muffler 248 may be positioned within a muffler box 250. The muffler box 250 can surround the muffler 248 managing heat transfer from the muffler 248 within the enclosure 132. The muffler box 250 may extend approximately from the engine 224 to the second sidewall 142 and approximately from the front wall 144 to the back wall 146 of the enclosure 132. The muffler box 250 may mount to the base 138 of the enclosure 132 and extend to a height above cylinders 238, 240 of the engine 224. The exhaust pipes 244, 246 may extend through an opening 252 into the muffler box 250, with the opening 252 positioned in an airflow path downstream from the engine fan 236. The muffler box 250 receives cooling air expelled from the engine 224 through the opening 252 and cools the muffler 248 by directing the cooling air over the muffler 248. The muffler box 250 may also direct the cooling air out of the enclosure 132 through vents 178 in the second sidewall 142.

The alternator 226 may be driven by the engine 224 to produce electrical power for distribution from the standby generator 130. The alternator 226 may have a first end 254 coupled to the engine 224 and a second end 256 having an alternator cooling fan 258 on a side of the alternator 226 opposite the engine 224. Alternator cooling duct 110 is shown coupled to a side of the alternator 226 proximate the first end 254 in fluid communication with the alternator cooling fan 258. Accordingly, the alternator may comprise an alternator cooling fan 258 that draws air through the alternator 226 in a direction opposite the engine 224. In a preferred embodiment, the alternator cooling duct 110 extends to an airflow opening 262 in the back wall 146 and includes a boot 264 sealing the air duct 110 to the opening 152. The alternator cooling fan 258 draws cooling air axially through the alternator 226 from the alternator cooling duct 110 and can drive the cooling air out of the enclosure 132 through vents 176 in the first sidewall 140.

The standby generator 130 may include a control system 266 to operate the generator 130. The control system 266 may include a control box 268 to receive generator control components therein. The control box 268 is shown mounted behind the alternator 226 to the back wall 146 in the right chamber 218. The control system 266 may include a touch screen display 270 mounted on the control box 268, which may receive control inputs and/or display generator operating parameters. The control system 266 may include a first and a second circuit breaker 272, 274 having manual switches mounted on an outer surface of the control box 268. The circuit breakers 272, 274 can couple to electrical distribution lines from the alternator 226 such that the manual switches can be operated to control electrical distribution from the generator 130. The control system 266 may also include a battery charger 276 mounted on the partition wall 222 to charge a first battery 278 and a second battery 280 located on the base 138 in front of the alternator 226. The batteries 278, 280 can be used to crank the engine 224 for startup in the event of a power outage in the utility grid.

Figure 14:
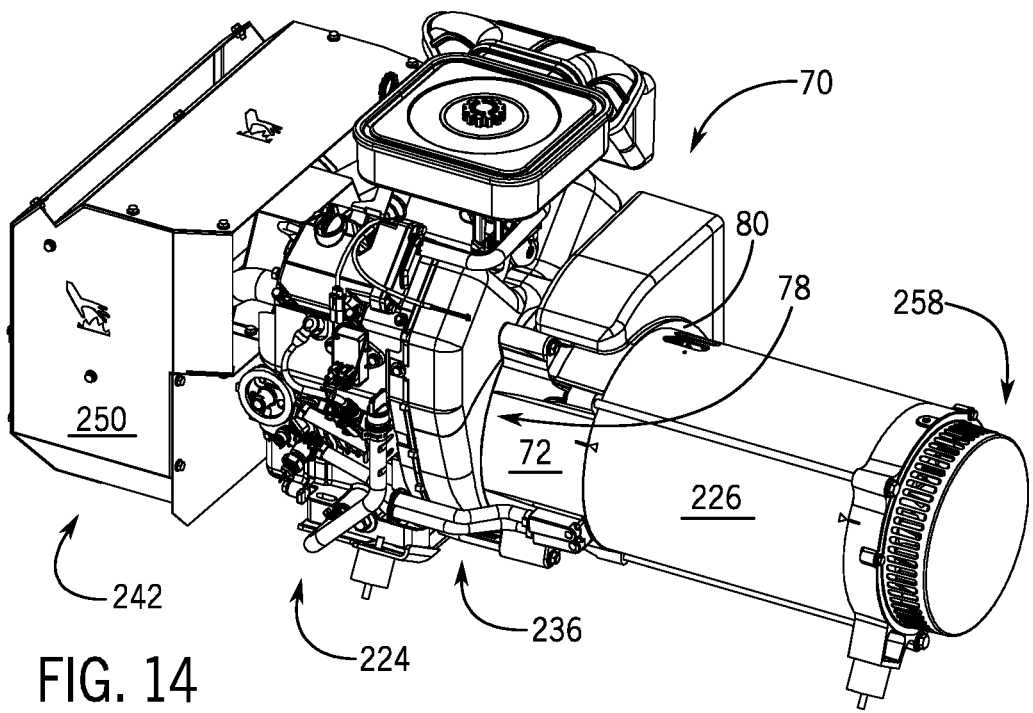
FIG. 14 is a perspective view showing components of the electrical generator of FIG. 12 from the right upper side of an alternator driven by an engine having a muffler positioned in a muffler box.
Figure 15:
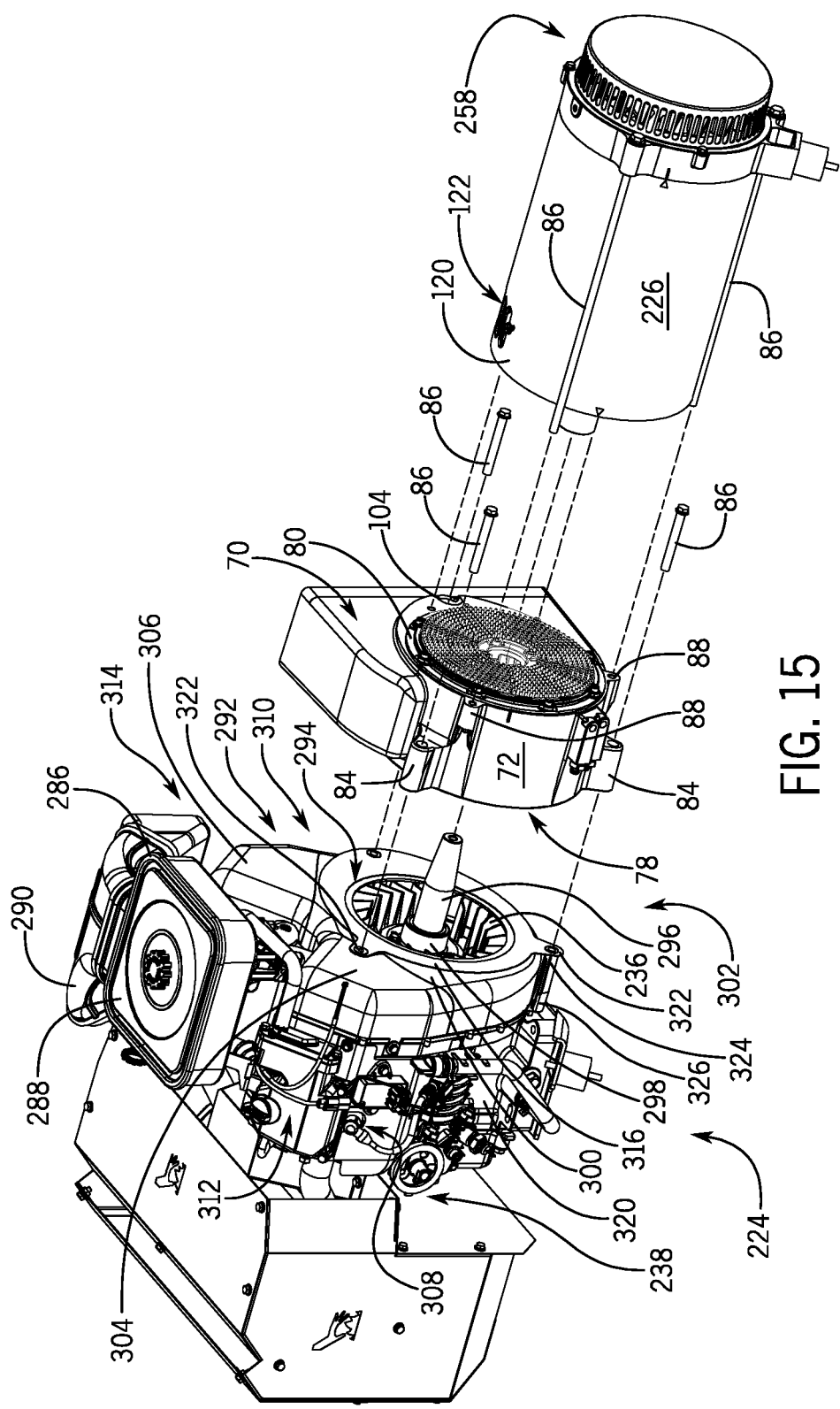
FIG. 15 is a perspective view similar to FIG. 14 having the alternator and the oil cooler and integrated adaptor component exploded from the engine.

As shown in FIGS. 14 and 15, the engine 224 may comprise a v-twin engine having two cylinders 238, 240. Each cylinder 238, 240 may receive a fuel and air mixture from a carburetor 286 located between or slightly above the cylinders 238, 240. The carburetor 286 mixes air with a liquid fuel, e.g. gasoline, and supplies the mixture to the cylinders 238, 240. The carburetor 286 can be coupled to receive air from an air filter 288 mounted on a top portion of the engine 224. The air filter 288 may receive air through an air duct 290.

FIG. 15 also shows a fan cover 292 mounted over the engine cooling fan 236 between the engine 224 and the alternator adaptor 70, the fan cover 292 preferably having an airflow opening 294 surrounding the crankshaft 296 of the engine. The engine fan 236 is shown mounted to the crankshaft 296 via a fan base 298. The engine fan 236 preferably draws a stream of cooling air through the alternator adaptor 70 into the opening 294 in a main section 300 of the fan cover 292. Accordingly, the engine cooling fan 236 may be operatively coupled to the crankshaft 296 on a side of the engine 224 driving the alternator 226.

The fan cover 292 may be mounted over a front side 302 of the engine 224. The fan cover 292 can include the main section 300 covering the engine fan 236, and a first arm 304 and a second arm 306 each extending from the main section to cover the front side 302 of a respective cylinder 238, 240. For instance, the fan cover 292 is shown mounted over the engine cooling fan 236 and over sides of two cylinder blocks 308, 310 and sides of two cylinder heads 312, 314 of the cylinders 238, 240 facing the alternator 226. The engine fan 236 preferably drives cooling air from the main section 300 through the first arm 304 and the second arm 306 to the cylinders 238, 240.

In order to provide for mounting of the engine 224 and engine cooling fan 236 to the alternator adaptor 70, the fan cover 292 includes an alternator adaptor mounting surface 316. The engine mounting flange 78 of alternator adaptor 70 extends from the main body 72 to mate against the alternator adaptor mounting surface 316 of the fan cover 292. Fasteners 86 can extend through openings in the alternator adaptor mounting surface 316 to mount the alternator adaptor 70 to a crankcase 320. The fan cover 292 is shown having three openings 322 for the fasteners 86 with one opening located in a tab 324 extending outward from the main section 300 of the fan cover 292. The crankcase 320 may have mounting locations 326 each comprising a boss extending forward from the engine 224 and each having a threaded opening to receive a respective fastener 86 from the alternator adaptor 70. As shown in FIG. 15, fasteners 86 are received in openings of first set of mounting projections 84 to couple the engine 224 to the alternator adaptor 70. Additionally, a fastener 86 is received in opening 104 of support arm 102 to couple the alternator adaptor 70 to the engine 224.

In order to provide for mounting of the alternator 226 to the alternator adaptor 70, the cylindrical outer casing 120 of the alternator 226 is sized to mount against and about the alternator mounting flange 80 on the alternator adaptor 70. The alternator mounting flange 80 may comprise a circular plate with an indented ridge around a perimeter edge to receive the cylindrical outer casing 120 of the alternator 226. As shown in FIG. 4, fasteners 326 are received in openings of projections 328 formed on the outer casing 120 of alternator 226 and extend through opening in second set of mounting projections 88 of main body 72 of alternator adaptor 70 to couple the alternator 226 to the alternator adaptor 70.

In operation of generator, the engine cooling fan 236 of engine 224 is driven by the crankshaft 296 to cool the engine 224, with the engine cooling fan drawing a first stream of air into the housing 132 of standby generator 130 through at least one of the one or more airflow openings/inlets 234 (FIG. 13) and driving the first stream of air out through at least one or more airflow outlets (e.g. vents 178) (FIG. 12). The inlet air duct 90 fluidly couples the engine 224 to the airflow openings/inlets 234 in fluid communication with the engine fan 236. The alternator fan 258 of alternator 226 is driven by the crankshaft 296, with the alternator fan cooling the alternator 226 by drawing a second stream of air into the housing 132 through at least one of the one or more airflow openings/inlets 262 (FIG. 13) and driving the second stream of air out through at least one or more airflow outlets (e.g. vents 176) (FIG. 12). The alternator cooling duct 110 couples the alternator 226 to the airflow inlets 262 in fluid communication with the alternator fan 258.

Beneficially, embodiments of the invention provide a double-sided oil cooler that may be cooled on both sides to optimize a thermal transfer of heat from engine oil flowing through the oil cooler to the ambient environment. Cooling fins on each of front and back surfaces of the oil cooler provide for enhanced convective heat transfer between the oil cooler and the environment, thereby providing for effective regulation of the engine oil temperature cycled therethrough. The oil cooler may be integrated into an adaptor component that may be used to arrange and mount an engine and alternator of a standby generator relative to one another. The adaptor component provides for separation between the front and back surfaces of the oil cooler, such that separate air flows may be directed over each of the front and back surfaces. The air flows may be independently controlled to provide optimized cooling to each of the engine and alternator.

Therefore, according to one embodiment of the invention, a standby generator includes an internal combustion engine, an alternator driven by the internal combustion engine to produce electrical power for distribution from the standby generator, and an adaptor component comprising a first end coupled to the engine and a second end spaced apart from the first end and coupled to the alternator. The adaptor component may be positioned such that the internal combustion engine is on a first side thereof and the alternator is on a second side thereof. An air-cooled oil cooler may be integrated with or affixed to the adapter component and include cooling fins formed on an outer surface thereof, the air-cooled oil cooler fluidly connected to the internal combustion engine to receive heated oil therefrom and return cooled oil thereto.

According to another embodiment of the invention, a standby generator includes an internal combustion engine, an alternator driven by the internal combustion engine to produce electrical power for distribution from the standby generator, and an adaptor component comprising a first end coupled to the engine and a second end spaced apart from the first end and coupled to the alternator. The adaptor component may be positioned such that the internal combustion engine is on a first side thereof and the alternator is on a second side thereof, and an oil cooler may be integrated with or affixed to the adapter component between the internal combustion engine and the alternator. The oil cooler may be fluidly connected to the internal combustion engine to receive heated oil therefrom and return cooled oil back thereto.

According to yet another embodiment of the invention, an engine-generator set includes an alternator adaptor having an engine mount with a cooling air opening formed therein, an alternator mount, and a frame comprising an outer casing holding the engine mount aligned with the alternator mount. The outer casing includes an airflow inlet fluidically connected to the cooling air opening to allow flow of engine cooling air through the alternator adaptor. The engine-generator set may include an air-cooled engine coupled to the engine mount and an alternator coupled to the alternator mount of the alternator adaptor. The air-cooled engine includes a crankshaft extending through the cooling air opening to drive the alternator and an engine cooling fan coupled to the crankshaft on a side of the air-cooled engine facing the alternator adaptor. The engine-generator set may also include an oil cooler fluidly connected to the air-cooled engine and configured to receive heated oil therefrom and return cooled oil thereto, the oil cooler integrated with or affixed to the alternator adaptor.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A standby generator comprising:
an internal combustion engine;
an alternator driven by the internal combustion engine to produce electrical power for distribution from the standby generator;
an adaptor component comprising a first end coupled to the internal combustion engine and a second end spaced apart from the first end and coupled to the alternator, the adaptor component positioned such that the internal combustion engine is on a first side thereof and the alternator is on a second side thereof; and
an air-cooled oil cooler integrated with or affixed to the adapter component and comprising cooling fins formed on an outer surface thereof, the air-cooled oil cooler fluidly connected to the internal combustion engine to receive heated oil therefrom and return cooled oil thereto.

2. The standby generator of claim 1 wherein the air-cooled oil cooler is integrated with or affixed to the adapter component at the second end thereof so as to be positioned adjacent the alternator.

3. The standby generator of claim 1 wherein:
the adaptor component comprises:
a main body forming the first end and the second end of the adaptor component, the main body comprising:
an engine mounting flange positioned at the first end and defining an airflow outlet of the main body;
an alternator mounting flange positioned at the second end; and
one or more vents formed therein between the first and second ends;
an inlet air duct positioned on the main body between the first end and the second end, the inlet air duct comprising a top wall, a bottom wall, and a pair of side walls that define an air inlet opening oriented perpendicular to the main body; and
an alternator cooling duct positioned adjacent the second end of the adaptor component and comprising a top wall, a bottom wall, and a pair of side walls that define an air inlet opening oriented perpendicular to the main body; and
the air-cooled oil cooler is integrated with or affixed to the adapter component adjacent the alternator mounting flange and adjacent one side wall of the pair of side walls of the inlet air duct.

4. The standby generator of claim 3 wherein:
the alternator comprises an outer casing having one or more vents formed therein;
the air inlet opening of the inlet air duct, the one or more vents in the main body, and the airflow outlet of the main body form a first air flow path to the internal combustion engine; and
the air inlet opening of the alternator cooling duct and the one or more vents in the outer casing of the alternator form a second air flow path to the alternator.

5. The standby generator of claim 4 wherein the air-cooled oil cooler comprises a double-sided oil cooler having cooling fins formed on each of front and back surfaces thereof, with the back surface of the air-cooled oil cooler positioned at least partially within the first air flow path and the front surface of the air-cooled oil cooler positioned at least partially within the second air flow path.

6. The standby generator of claim 5 further comprising:
an engine cooling fan positioned adjacent the first end of the adaptor component and configured to draw a flow of cooling air through the first air flow path and direct the flow of cooling air toward the internal combustion engine; and
an alternator cooling fan positioned adjacent the second end of the adaptor component and configured to draw a flow of cooling air through the second air flow path and direct the flow of cooling air toward the alternator.

7. The standby generator of claim 1 wherein:
the air-cooled oil cooler comprises a base plate and a cover plate joined together to form a cavity configured to receive the heated oil from the internal combustion engine therethrough; and
the base plate includes:
an interior wall and an exterior wall that define boundaries of the cavity;
an inlet port and an outlet port positioned to provide a flow of oil into and out of the cavity;
a divider wall extending between the exterior wall and the interior wall and positioned to separate the inlet port and the outlet port; and
a waffle iron pattern of wall portions arranged within the cavity to provide a plurality of tortuous flow paths through which oil flows from the inlet port to the outlet port when flowing through the cavity.

8. A standby generator comprising:
an internal combustion engine;
an alternator driven by the internal combustion engine to produce electrical power for distribution from the standby generator;
an adaptor component comprising a first end coupled to the internal combustion engine and a second end spaced apart from the first end and coupled to the alternator, the adaptor component positioned such that the internal combustion engine is on a first side thereof and the alternator is on a second side thereof; and
an oil cooler comprising a cavity fluidly connected to the internal combustion engine to receive heated oil therefrom and return cooled oil back thereto and comprising a plurality of tortuous flow paths within the cavity for oil to flow through the oil cooler, the oil cooler integrated with or affixed to the adapter component between the internal combustion engine and the alternator.

9. The standby generator of claim 8 wherein the oil cooler is integrated with or affixed to the adapter component at the second end thereof, so as to be positioned adjacent the alternator.

10. The standby generator of claim 8 wherein:
the adaptor component comprises:
a main body forming the first end and the second end of the adaptor component, the main body comprising:
an engine mounting flange positioned at the first end and defining an airflow outlet of the main body;
an alternator mounting flange at the second end; and
one or more vents formed therein between the first and second ends;
an inlet air duct positioned on the main body between the first end and the second end, the inlet air duct comprising a top wall, a bottom wall, and a pair of side walls that define an air inlet opening oriented perpendicular to the main body; and an alternator cooling duct positioned adjacent the second end of the adaptor component and comprising a top wall, a bottom wall, and a pair of side walls that define an air inlet opening oriented perpendicular to the main body;

the oil cooler is integrated with or affixed to the adapter component adjacent the alternator mounting flange and adjacent a side wall of the pair of side walls of the inlet air duct.

11. The standby generator of claim 10 wherein:

the alternator comprises an outer casing having one or more vents formed therein;

the air inlet opening of the inlet air duct, the one or more vents in the main body, and the airflow outlet of the main body form a first air flow path to the internal combustion engine; and the air inlet opening of the alternator cooling duct and the one or more vents in the outer casing of the alternator form a second air flow path to the alternator.

12. The standby generator of claim 11 wherein the oil cooler comprises a double-sided oil cooler having cooling fins formed on each of front and back surfaces thereof, with the back surface of the oil cooler positioned at least partially within the first air flow path and the front surface of the oil cooler positioned at least partially within the second air flow path.

13. The standby generator of claim 12 further comprising:

an engine cooling fan positioned adjacent the first end of the adaptor component and configured to draw a flow of cooling air through the first air flow path and direct the flow of cooling air toward the internal combustion engine; and an alternator cooling fan positioned adjacent the second end of the adaptor component and configured to draw a flow of cooling air through the second air flow path and direct the flow of cooling air toward the alternator.

14. The standby generator of claim 8 wherein:

the oil cooler comprises a base plate and a cover plate joined together to form the cavity configured to receive the heated oil from the internal combustion engine therethrough; and the base plate includes:
an interior wall and an exterior wall that define boundaries of the cavity;
an inlet port and an outlet port positioned to provide a flow of oil into and out of the cavity;
a divider wall extending between the exterior wall and the interior wall and positioned to separate the inlet port and the outlet port; and
a waffle iron pattern of wall portions arranged within the cavity to provide the plurality of tortuous flow paths through which oil flows from the inlet port to the outlet port when flowing through the cavity.

15. An engine-generator set comprising:

an alternator adaptor comprising:
an engine mount comprising a cooling air opening formed therein,
an alternator mount, and
a frame comprising an outer casing holding the engine mount aligned with the alternator mount, the outer casing comprising an airflow inlet fluidically connected to the cooling air opening to allow flow of engine cooling air through the alternator adaptor;

an air-cooled engine coupled to the engine mount of the alternator adaptor, the air-cooled engine comprising:
a crankshaft extending through the cooling air opening, and an engine cooling fan coupled to the crankshaft on a side of the air-cooled engine facing the alternator adaptor;

an alternator coupled to the alternator mount and driven by the crankshaft; and an oil cooler fluidly connected to the air-cooled engine and configured to receive heated oil therefrom and return cooled oil thereto, the oil cooler integrated with or affixed to the alternator adaptor.

16. The engine-generator set of claim 15 wherein the oil cooler is integrated with or affixed to the alternator adaptor such that a front surface of the oil cooler is outside of an interior volume of the outer casing and a back surface of the oil cooler is within the interior volume of the outer casing, the oil cooler including cooling fins on each of the front surface and the back surface thereof.

17. The engine-generator set of claim 15 further comprising:

an inlet air duct coupled to the airflow inlet and extending outward from the outer casing;

wherein the inlet air duct, the airflow inlet in the outer casing, and the cooling air opening in the engine mount form a first airflow path to the air-cooled engine; and wherein at least a portion of the oil cooler is positioned within the first airflow path.

18. The engine-generator set of claim 17 further comprising:

an alternator cooling duct positioned adjacent the alternator mount;

wherein the alternator further comprises an outer housing including one or more vents;

wherein the alternator cooling duct and the one or more vents in the outer housing of the alternator form a second airflow path to the alternator; and wherein a portion of the oil cooler is positioned within the second airflow path.

19. The engine-generator set of claim 18 wherein the oil cooler comprises a double-sided oil cooler having cooling fins formed on each of front and back surfaces thereof, with the back surface of the oil cooler positioned at least partially within the first airflow path and the front surface of the oil cooler positioned at least partially within the second airflow path.

20. The engine-generator set of claim 19 wherein the engine cooling fan is configured to draw a flow of cooling air though the first airflow path and direct the flow of cooling air toward the air-cooled engine; and wherein the alternator comprises an alternator cooling fan driven by the crankshaft, the alternator cooling fan configured to draw a flow of cooling air though the second airflow path and direct the flow of cooling air toward the alternator.

21. The engine-generator set of claim 17 wherein:

the airflow inlet is perpendicular to the cooling air opening and is positioned between the alternator mount and the cooling air opening; and the inlet air duct extends outward from the outer casing in a direction perpendicular to the crankshaft.

22. The engine-generator set of claim 15 wherein:

the oil cooler comprises an engine crankshaft opening formed therein and is coupled to the alternator mount to block airflow therethrough; and the crankshaft extends through the engine crankshaft opening formed in the oil cooler.

23. The engine-generator set of claim 15 wherein the oil cooler comprises a first outer surface and a second outer surface opposite the first outer surface, the first outer surface having a first set of cooling fins formed thereon and the second outer surface having a second set of cooling fins formed thereon.

24. The engine-generator set of claim 23 wherein:
the alternator adaptor is constructed to define:
   a first airflow path configured to direct a first airflow across the first set of cooling fins; and
   a second airflow path separated from the first airflow path and configured to direct a second airflow across the second set of cooling fins to provide double-sided cooling to the oil cooler.

\* \* \* \* \*